(12) United States Patent
Jiang

(10) Patent No.: US 12,519,182 B2
(45) Date of Patent: Jan. 6, 2026

(54) ELECTROCHEMICAL APPARATUS, PREPARATION METHOD THEREOF, AND ELECTRONIC APPARATUS

(71) Applicant: Ningde Amperex Technology Limited, Ningde (CN)

(72) Inventor: Jing Jiang, Dongguan (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 560 days.

(21) Appl. No.: 17/979,937

(22) Filed: Nov. 3, 2022

(65) Prior Publication Data

US 2023/0140618 A1 May 4, 2023

(30) Foreign Application Priority Data

Nov. 4, 2021 (CN) .......................... 202111302019.8

(51) Int. Cl.
*H01M 50/46* (2021.01)
*H01M 4/13* (2010.01)
*H01M 50/469* (2021.01)
*H01M 4/02* (2006.01)

(52) U.S. Cl.
CPC ............ *H01M 50/46* (2021.01); *H01M 4/13* (2013.01); *H01M 50/469* (2021.01); *H01M 2004/027* (2013.01); *H01M 2004/028* (2013.01)

(58) Field of Classification Search
CPC ...... H01M 50/46; H01M 4/13; H01M 50/469; H01M 2004/027; H01M 2004/028; H01M 10/0587; H01M 50/461; H01M 10/0431; H01M 10/052; Y02E 60/10; Y02P 70/50
See application file for complete search history.

(56) References Cited

U.S. PATENT DOCUMENTS

2018/0034028 A1 2/2018 Jung et al.
2020/0227759 A1* 7/2020 Jiang ...................... H01M 50/40
(Continued)

FOREIGN PATENT DOCUMENTS

| CN | 103825056 A | 5/2014 |
|---|---|---|
| CN | 204407374 U | 6/2015 |
| CN | 204885329 U | 12/2015 |

(Continued)

OTHER PUBLICATIONS

CN 211404658 machine English translation (Year: 2020).*
(Continued)

*Primary Examiner* — Michael L Dignan
(74) *Attorney, Agent, or Firm* — WHDA, LLP

(57) ABSTRACT

An electrochemical apparatus includes an electrode assembly, where the electrode assembly includes a positive electrode plate, a negative electrode plate, and a separator. The separator is disposed between the positive electrode plate and the negative electrode plate. The positive electrode plate, the negative electrode plate, and the separator are made into the electrode assembly through winding. The electrochemical apparatus further includes a first bonding member. The positive electrode plate includes a first starting section. A first end of the first bonding member is bonded to the first starting section, and a second end of the first bonding member is bonded to the separator.

19 Claims, 16 Drawing Sheets

(56) References Cited

U.S. PATENT DOCUMENTS

2022/0166071 A1* 5/2022 Takahashi ............... H04L 47/34
2023/0361359 A1* 11/2023 Zhang ................. H01M 50/474

FOREIGN PATENT DOCUMENTS

| | | | | |
|---|---|---|---|---|
| CN | 106159348 | B | 7/2018 | |
| CN | 207572477 | U | 7/2018 | |
| CN | 208173683 | U | 11/2018 | |
| CN | 110364769 | A | 10/2019 | |
| CN | 211404658 | | * 9/2020 | ........ H01M 10/0525 |
| CN | 211404658 | U | 9/2020 | |
| CN | 111916845 | A | 11/2020 | |
| CN | 112635847 | A | 4/2021 | |
| CN | 113140806 | A | 7/2021 | |
| CN | 113366690 | A | 9/2021 | |
| CN | 113471630 | A | 10/2021 | |
| EP | 3764452 | A1 | 1/2021 | |
| JP | 2000-067907 | A | 3/2000 | |
| JP | 2005-196974 | A | 7/2005 | |
| JP | 2020-194930 | A | 12/2020 | |
| WO | 2016/174991 | A1 | 11/2016 | |
| WO | 2017/008269 | | 1/2017 | |

OTHER PUBLICATIONS

Office Action dated Jun. 30, 2022, issued in counterpart CN application No. 202111302019.8 with English translation. (14 pages).
Notice of Allowance dated Jul. 1, 2023, issued in counterpart CN Application No. 202111302019.8. (4 pages).
Office Action dated Mar. 31, 2023, issued in counterpart CN Application No. 202111302019.8. (3 pages).
Extended European Search Report dated Mar. 17, 2023, issued in counterpart EP Application No. 22205421.5. (9 pages).
Office Action dated Mar. 9, 2023, issued in counterpart IN Application No. 202214062881, with English translation. (5 pages).
Hearing Notice dated Jul. 16, 2024, issued in counterpart IN Application No. 202214062881, with English translation. (2 pages).

* cited by examiner

ELECTROCHEMICAL APPARATUS, PREPARATION METHOD THEREOF, AND ELECTRONIC APPARATUS

CROSS-REFERENCE TO RELATED APPLICATIONS

This application claims the priority of Chinese Application No. 202111302019.8, filed on Nov. 4, 2021, which is incorporated herein by reference in its entirety.

TECHNICAL FIELD

This application relates to the field of energy storage technologies, and in particular, to an electrochemical apparatus, a preparation method thereof, and an electronic apparatus containing such electrochemical apparatus.

BACKGROUND

In lithium batteries, to increase volumetric energy density of the lithium batteries, size differences between negative electrode plates and positive electrode plates are preferably minimized to the greatest extent. In order to alleviate lithium precipitation, the sizes of the negative electrode plates are generally greater than those of the positive electrode plates. In addition, due to difficulty in manufacturing control, it is necessary to reserve great size differences between the negative electrode plates and the positive electrode plates, which has great impact on energy density. In view of this, lithium batteries with better safety performance and higher energy density are required.

SUMMARY

In view of the foregoing situation, this application provides an electrochemical apparatus, a preparation method thereof, and an electronic apparatus containing such electrochemical apparatus, to resolve the foregoing problem.

An embodiment of this application provides an electrochemical apparatus, including an electrode assembly, where the electrode assembly includes a positive electrode plate, a negative electrode plate, and a separator, the separator is disposed between the positive electrode plate and the negative electrode plate, and the positive electrode plate, the negative electrode plate, and the separator are wound to form the electrode assembly. The electrochemical apparatus further includes a first bonding member, the positive electrode plate includes a first starting section, a first end of the first bonding member is bonded to the first starting section, and a second end of the first bonding member is bonded to the separator. In this way, the first bonding member being provided between the first starting section of the positive electrode plate and the separator reduces dislocation of the electrode plate during winding, reduces lithium precipitation in the electrochemical apparatus, and maintains high volumetric energy density.

In some embodiments, a winding starting layer of the separator includes a first straight portion and a first bent portion, where the first straight portion and the first bent portion are connected to each other. The negative electrode plate includes a second starting section. In a first direction, an end of the second starting section exceeds an end of the first starting section, the end of the second starting section is located at a side of the first bent portion, and a second end of the first bonding member is bonded to a side of the first bent portion facing away from the second starting section, so that the first bonding member compensates for insufficient thickness of a region from the end of the first starting section of the positive electrode plate to the bent portion of the separator, to balance thickness of the electrode assembly, improve an interface of the electrode plate in a bent region, and reduce lithium precipitation.

In some embodiments, in the first direction, the first bent portion exceeds the end of the first starting section; in the first direction, width of the electrode assembly is $W_1$, a length of a portion of the first starting section covered by the first bonding member is $L_1$, and a length of a portion of the first starting section not covered by the first bonding member is $L_2$; in a second direction, a thickness of the electrode assembly is $T_1$; and the second direction is perpendicular to the first direction; where $(W_1-T_1)/10 < (L_1+L_2)/2 < (W_1-T_1)/2$.

In some embodiments, in the first direction, a distance between the end of the first starting section and an end of the first bent portion is $L_3$, where $0 \text{ mm} < L_3 \leq 10 \text{ mm}$.

In this way, the foregoing size is limited to ensure a bonding and fastening effect of the first bonding member without occupying excessively large energy density space.

In some embodiments, in the first direction, a length of the first starting section is $L_4$, and a length of the second starting section is $L_5$, where $L_4-L_1 \leq L_5$. This helps ensure that the negative electrode plate is longer than the positive electrode plate in a horizontal direction, and the negative electrode plate has sufficient lithium intercalation positions, to reduce lithium precipitation at an end of the negative electrode plate.

In some embodiments, the first bonding member includes a substrate layer and a first bonding layer, where the substrate layer includes a first surface and a second surface opposite to the first surface, and the first bonding layer is bonded the first starting section and the separator. In this way, a bonding layer being provided on a single side of the substrate layer of the first bonding member helps reduce thickness of the bonding member and reduce energy density space occupied by the first bonding member.

In some embodiments, the first bonding member is bent, and the first bonding layer of the first end and the first bonding layer of the second end are disposed toward a same side of the substrate layer.

In some embodiments, the first bonding member is bent, and the first bonding layer of the first end and the first bonding layer of the second end are disposed facing opposite directions separately.

In some embodiments, the first bonding member further includes a second bonding layer, where the second bonding layer is disposed on the second surface of the substrate layer, the first bonding member covers the end of the first starting section, the first bonding layer is bonded to the separator, and the second bonding layer is bonded to two opposite side surfaces of the first starting section. In this way, the first bonding member in a form of a double-sided adhesive tape covers the end of the first starting section and bonds the end of the first starting section to the separator to fasten a wound electrode plate and reduce dislocation of the electrode plate.

In some embodiments, the electrochemical apparatus further includes a tab, where the tab is connected to the electrode assembly; and in a second direction, a projection of the first bonding member and a projection of the tab on a surface of the electrode assembly do not overlap, so that the first bonding member is not included in total thickness of the electrode assembly, ensuring balance of thickness of the electrode assembly and ensuring that energy density of the electrode assembly is not affected.

In some embodiments, in a third direction, a side edge of the first bonding member exceeds a side edge of the positive electrode plate; and on a same side edge, a distance between the side edge of the first bonding member and the side edge of the positive electrode plate is 0 mm-10 mm, so that the first bonding member can fasten the positive electrode plate and the separator in the third direction to reduce offset of the positive electrode plate in the third direction, thereby reducing short circuit or lithium precipitation inside the electrode assembly.

In some embodiments, the electrochemical apparatus further includes a second bonding member, the separator is on an outermost ring of the electrode assembly, and the second bonding member is disposed at a terminating end of the separator to further fasten the electrode plate in the electrode assembly at a position.

In some embodiments, in the second direction, a projection of the second bonding member and the projection of the tab on the surface of the electrode assembly do not overlap, ensuring balance of thickness of the electrode assembly and reducing impact on energy density of the electrode assembly.

In some embodiments, a thickness of the first bonding member is 3 μm-100 μm; a material of the substrate layer includes one or more of polyolefin, polyacrylonitrile, polyol ester, polyamide, polyurethane, or a compound thereof; and a material of the first bonding layer includes one or more of polyolefin, polyurethane, polyacrylate, organosilicone, rubber, or a compound thereof.

In some embodiments, the first bonding layer is configured to bond the first starting section and the separator during use. The first bonding member cannot be melted and extended at high temperature. During winding of the electrode assembly, the first bonding member may be configured to bond the positive electrode plate and the separator at room temperature instead of bonding through melting at high temperature.

In some embodiments, an edge of the first bonding member is neat, and a coverage range of the first bonding member is not increased at high temperature to avoid impact on capacity of the electrochemical apparatus.

An embodiment of this application further provides a preparation method of electrochemical apparatus, where the preparation method is used for preparing the electrochemical apparatus described in the foregoing embodiments, and the preparation method includes:

preparing a first bonding layer to bond a first bonding member to a winding starting end of a positive electrode plate;

stacking the positive electrode plate, a negative electrode plate, and a separator, where a first end of the first bonding member is bonded to the positive electrode plate, and a second end of the first bonding member is bonded to the separator; and winding the positive electrode plate, the negative electrode plate, and the separator that are stacked, where the separator is disposed between the positive electrode plate and the negative electrode plate.

This application further provides an electronic apparatus, including the foregoing electrochemical apparatus.

In the electrochemical apparatus provided in this application, the first bonding member is provided between the first starting section of the positive electrode plate and the separator, reducing movement and dislocation of the separator and the electrode plate in a length direction and increasing energy density of batteries. In addition, the first bonding member bonds an end region of the first starting section and the separator in a small range, which can keep the edge of the negative electrode plate larger than that of the positive electrode plate and minimize the size difference between the edge of the negative electrode plate and the edge of the positive electrode plate to the greatest extent, thereby effectively increasing energy density, inhibiting formation of lithium dendrites and enhancing safety performance.

Figure 1:
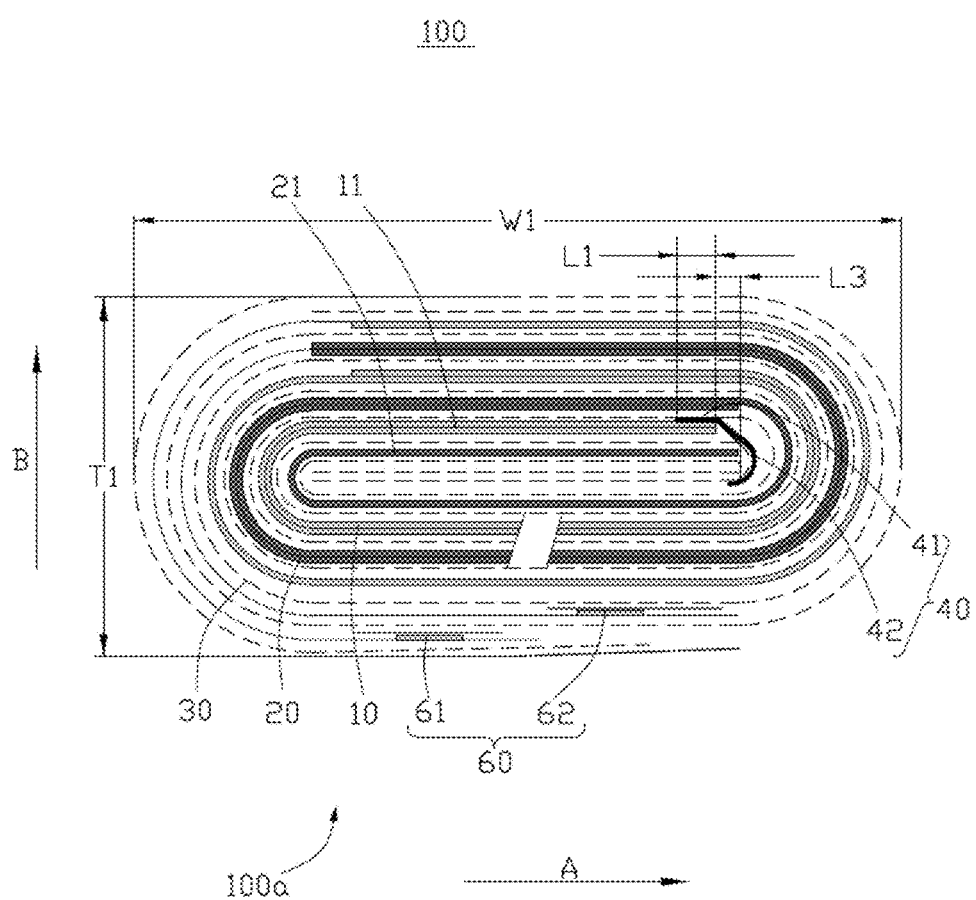
FIG. 1 is a schematic diagram of a wound structure of an electrode assembly of an electrochemical apparatus in an example.

| Reference signs of main components: | |
|---|---|
| electrochemical apparatus | 100 |
| electrode assembly | 100a, 100b, 100c, 100d, 100e, 100f, |
| positive electrode plate | 10 |
| first starting section | 11 |
| third surface | 111 |
| fourth surface | 112 |
| negative electrode plate | 20 |
| second starting section | 21 |
| separator | 30 |
| first straight portion | 31 |
| first bent portion | 32 |
| first bonding member | 40 |
| first end | 41 |
| second end | 42 |
| substrate layer | 43 |
| first surface | 431 |

| Reference signs of main components: | |
|---|---|
| second surface | 432 |
| first bonding layer | 44 |
| second bonding layer | 45 |
| second bonding member | 50 |
| tab | 60 |
| positive electrode tab | 61 |
| negative electrode tab | 62 |
| third bonding member | 70 |
| first direction | A |
| second direction | B |
| third direction | C |

DETAILED DESCRIPTION

The following clearly describes the technical solutions in some embodiments of this application with reference to the accompanying drawings in some embodiments of this application. Apparently, the described embodiments are some but not all embodiments of this application.

It should be noted that when a component is referred to as being "fastened to" another component, it may be directly fastened to the another component, or there may be a component in between. When a component is deemed as being "connected to" another component, it may be directly connected to the another component, or there may be a component in between. When a component is deemed as being "provided on" another component, it may be directly provided on the another component, or there may be a component in between. The terms "vertical", "horizontal", "left", "right", and other similar expressions as used herein are for illustration only.

Unless otherwise defined, all technical and scientific terms used herein shall have the same meanings as commonly understood by those skilled in the art to which this application belongs. The terms used herein in the specification of this application are merely intended to describe specific embodiments but not intended to limit this application. The term "and/or" used herein includes any and all combinations of one or more related listed items.

For a manufacturing process, especially a process of wound batteries, manufacturing accuracy is difficult to control due to fluctuation and tolerance of a device and the process; and especially, the smaller the size of the battery cell, the more difficult it is to control the manufacturing accuracy. A larger dislocation region needed to be reserved in a length direction of an electrode plate indicates greater impact on energy density. Insufficient winding process control capability is likely to cause a problem that edges of positive and negative electrode plates are flush or the positive electrode plate exceeds the negative electrode plate or even exceeds a separator, causing a safety risk of lithium precipitation and short circuit. With poor control over winding accuracy, if a larger dislocation region is reserved between the positive electrode plate and the negative electrode plate, for a small-sized battery, stacking the electrode plates inside the battery may further reduce energy density of the battery in a thickness direction.

This application provides an electrochemical apparatus, including an electrode assembly, where the electrode assembly includes a positive electrode plate, a negative electrode plate, and a separator, the separator is disposed between the positive electrode plate and the negative electrode plate, and the positive electrode plate, the negative electrode plate, and the separator are wound to form the electrode assembly. The electrochemical apparatus further includes a first bonding member, the positive electrode plate includes a first starting section, a first end of the first bonding member is bonded to the first starting section, and a second end of the first bonding member is bonded to the separator.

In the electrochemical apparatus, the first bonding member being provided between the first starting section of the positive electrode plate and the separator reduces dislocation of the electrode plate during winding, reduces lithium precipitation in the electrochemical apparatus, and maintains high volumetric energy density.

Some embodiments of this application are described in detail. Provided that there is no conflict, the following embodiments and features in the embodiments may be combined with each other.

Referring to FIG. 1, in Example 1, the electrochemical apparatus 100 includes an electrode assembly 100a, where the electrode assembly 100a includes a positive electrode plate 10, a negative electrode plate 20, and a separator 30. The separator 30 is disposed between the positive electrode plate 10 and the negative electrode plate 20. The positive electrode plate 10, the negative electrode plate 20, and the separator 30 are wound to form the electrode assembly 100a. The electrochemical apparatus 100 further includes a first bonding member 40, the positive electrode plate 10 includes a first starting section 11, a first end 41 of the first bonding member 40 is bonded to the first starting section 11, and a second end 42 of the first bonding member 40 is bonded to the separator 30. In this way, the first bonding member 40 being provided between the first starting section 11 of the positive electrode plate 10 and the separator 30 reduces dislocation of the electrode plate during winding, reduces lithium precipitation in the electrochemical apparatus 100, and maintains high volumetric energy density. The electrochemical apparatus 100 includes but is not limited to an apparatus such as a battery.

Figure 2:
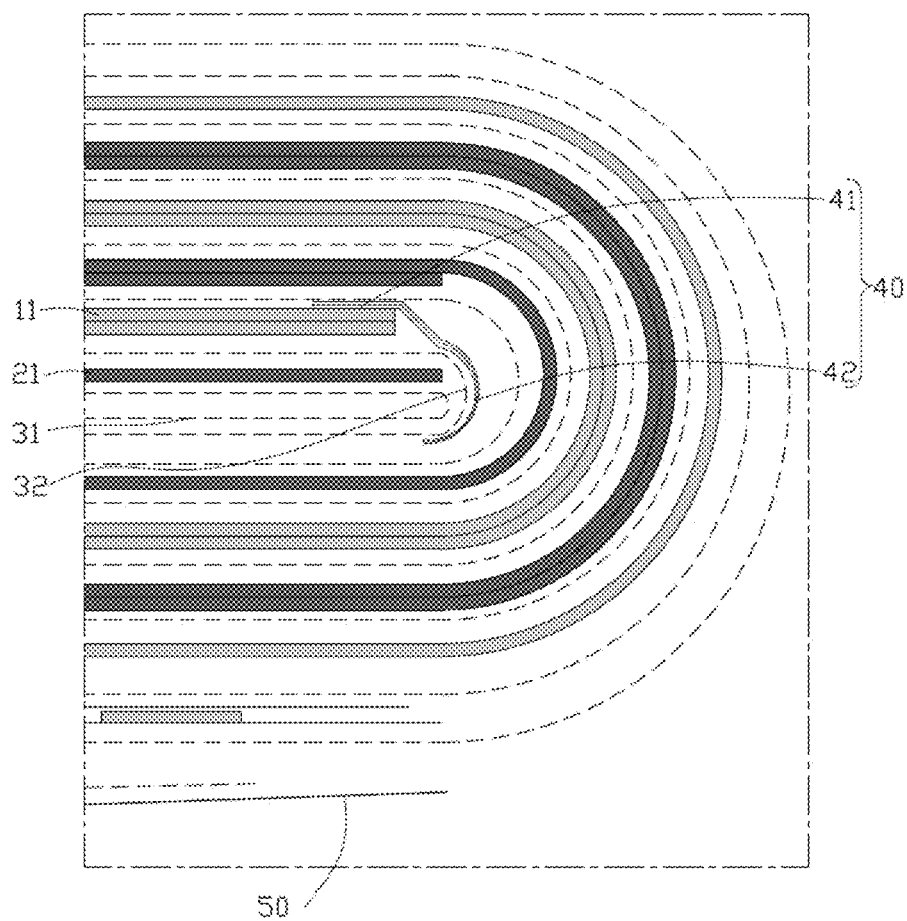
FIG. 2 is an enlarged view of a partial structure of the electrode assembly shown in FIG. 1.

Further referring to FIG. 2, the negative electrode plate 20 includes a second starting section 21. In a first direction A, an end of the second starting section 21 exceeds an end of the first starting section 11, so that the negative electrode plate 20 has sufficient lithium intercalation positions, thereby reducing lithium precipitation. In this example of this application, the first direction A is a length direction of the electrode assembly 100a or a length direction of the electrode plate after being unfolded.

Two layers of separators 30, the positive electrode plate 10, and the negative electrode plate 20 are stacked in a sequence of "the separator, the negative electrode plate, the separator, and the positive electrode plate", and then wound to form the electrode assembly 100a. The separator 30 located between the first starting section 11 and the second starting section 21 is bonded to the second end 42 of the first bonding member 40. Specifically, a winding starting layer of the separator 30 includes a first straight portion 31 and a first bent portion 32, where the first straight portion and the first bent portion 32 are connected to each other. The "straight portion" in this application is a relatively straight section formed during winding of the separator and includes but is not limited to a 180-degree horizontal straight section. In the first direction A, the end of the second starting section 21 is located at a side of the first bent portion 32, the first bent portion 32 exceeds the end of the first starting section 11, and the second end 42 of the first bonding member 40 is bonded to a side of the first bent portion 32 facing away from the second starting section 21, so that the first bonding member 40 fastens the electrode plate and compensates for insufficient thickness of a region from the end of the first starting section 11 of the positive electrode plate 10 to the bent portion of the separator 30, to balance thickness of the electrode assembly 100a, improve an interface of the electrode plate in a bent region, and reduce lithium precipitation.

Figure 3:
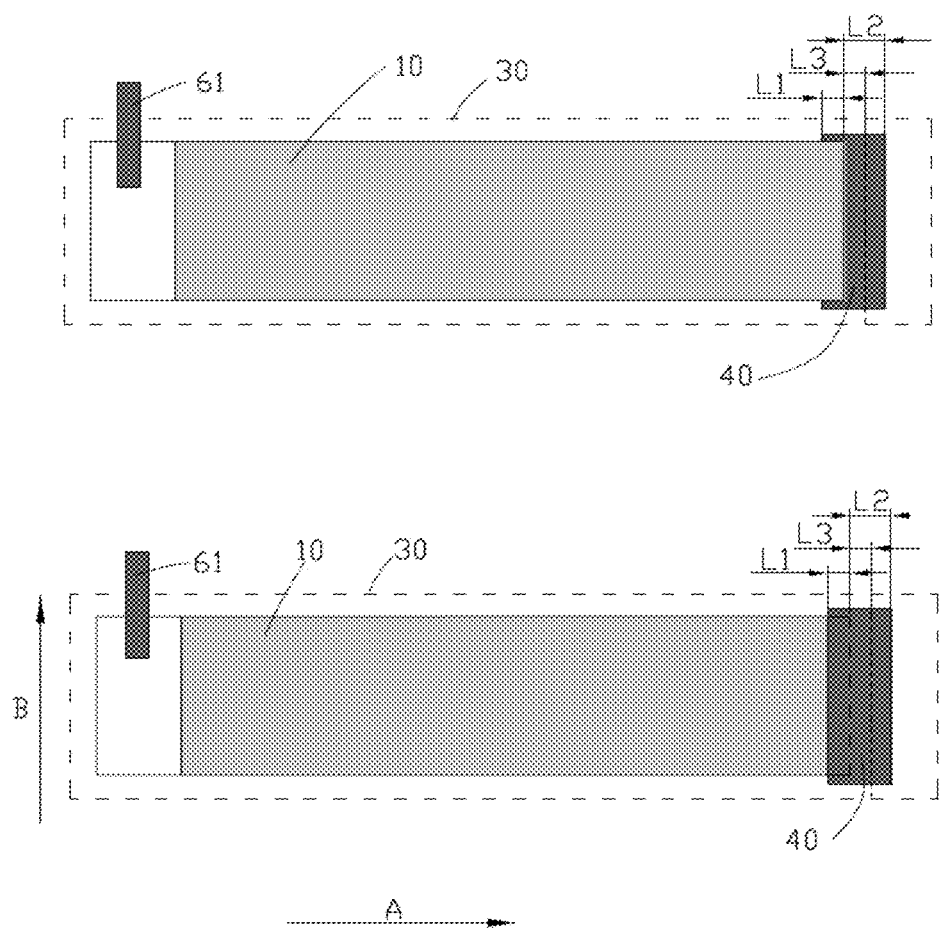
FIG. 3 is a schematic structural diagram of two opposite side surfaces of a positive electrode plate, a first bonding member, and a separator after being unfolded.

Referring to FIG. 1 and FIG. 3, in the first direction A, width of the electrode assembly 100a is $W_1$, a length of a portion of the first starting section 11 covered by the first bonding member 40 is $L_1$, and a length of a portion of the first starting section 11 not covered by the first bonding member 40 is $L_2$, that is, a length of a portion of the first bonding member 40 extending beyond the first starting section 11 is $L_2$, and a distance between the end of the first starting section 11 and an end of the first bent portion 32 is $L_3$. In a second direction B, a thickness of the electrode assembly 100a is $T_1$, where $(W_1-T_1)/10<(L_1+L_2)/2<(W_1-T_1)/2$, and 0 mm$<L_3\leq$10 mm. The second direction B is perpendicular to the first direction A, and the second direction B may be a thickness direction of the electrode assembly 100a. In this example of this application, the first starting section 11 of the positive electrode plate 10 includes a positive electrode current collector and a positive electrode active substance layer provided on a surface of the positive electrode current collector, where the first bonding member 40 is bonded to a surface of the positive electrode active substance layer of the first starting section 11.

In Example 1 of this application, the first bonding member 40 is configured as a single-sided adhesive structure. A length $L_1$ of a portion of the active substance layer of the first starting section 11 covered by the first bonding member 40 is 5 mm, and a length $L_2$ of a portion of the active substance layer of the first starting section 11 not covered by the first bonding member 40 is 10 mm. The electrode assembly formed through winding has a width $W_1$ of 37 mm and a maximum thickness $T_1$ of 5.6 mm.

The foregoing size is limited to ensure a bonding and fastening effect of the first bonding member 40 without occupying excessively large energy density space by the first bonding member 40, thereby reducing impact of the first bonding member 40 on energy density of the electrode assembly 100a.

Relative positions of starting and terminating portions between the positive and negative electrode plates and the separator affect energy density of the electrochemical apparatus 100 and lithium precipitation in the electrochemical apparatus 100 during cycling. For the negative electrode plate 20 and the positive electrode plate 10 at corresponding positions, if capacity of the negative electrode plate 20 is less than that of the positive electrode plate 10, lithium precipitation is likely to occur on the surface of the negative electrode plate 20 during charging of the electrochemical apparatus 100, which damages an interface of the electrode plate, thereby affecting swelling thickness of the electrochemical apparatus 100 after cycling. Lithium precipitation is also likely to cause puncture of the separator between the positive electrode plate and the negative electrode plate, which directly causes short circuit, causes a safety problem, and degrades safety performance of the electrochemical apparatus 100. The first bonding member 40 disposed at a front portion of the positive electrode plate 10 can not only bond and fasten the electrode plate to the separator to maintain stable relative positions of the electrode plate and the separator, but also cover partially an active substance at the front portion of positive electrode plate 10 to ensure that capacity of the positive electrode plate 10 at a winding starting position is less than that of the negative electrode plate 20, thereby reducing lithium precipitation and enhancing safety performance of the electrochemical apparatus 100.

Figure 4:
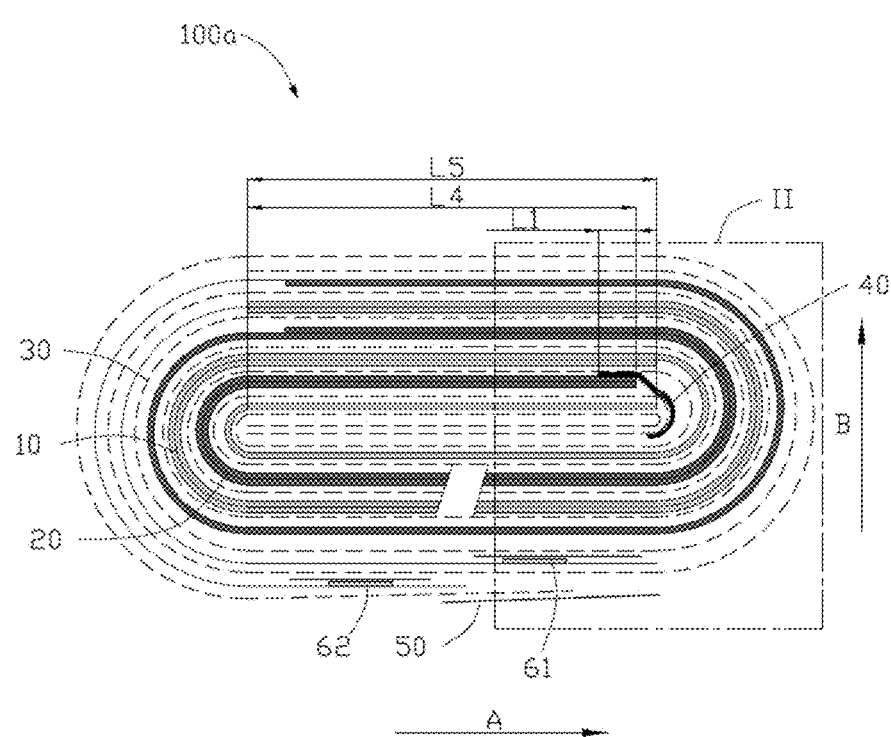
FIG. 4 is a schematic structural diagram of the electrode assembly shown in FIG. 1.

Further, referring to FIG. 4, in the first direction A, a length of the first starting section 11 is $L_4$, and a length of the second starting section 21 is $L_5$, where $L_4-L_1\leq L_5$. This helps ensure that the negative electrode plate 20 is longer than the positive electrode plate 10 in a horizontal direction, and the negative electrode plate 20 has sufficient lithium intercalation positions, to reduce lithium precipitation at an end of the negative electrode plate 20.

In the second direction B, a projection of the first bonding member 40 and a projection of the tab on the surface of the electrode assembly 100a partially overlaps, that is, the first bonding member 40 covers at least part of the first bent portion 32, and the first bonding member 40 is bonded in a winding direction of the electrode plate, to fasten the electrode plate and the separator during winding and reduce peeling of the first bonding member 40. In addition, the end of the second starting section 21 of the negative electrode plate 20 is not bent, and the second end 42 of the first bonding member 40 together with a structure of the first bent portion 32 is bent surrounding the end of the negative electrode plate 20, which is more conducive to balance of thickness of the electrode assembly 100a.

Figure 5:
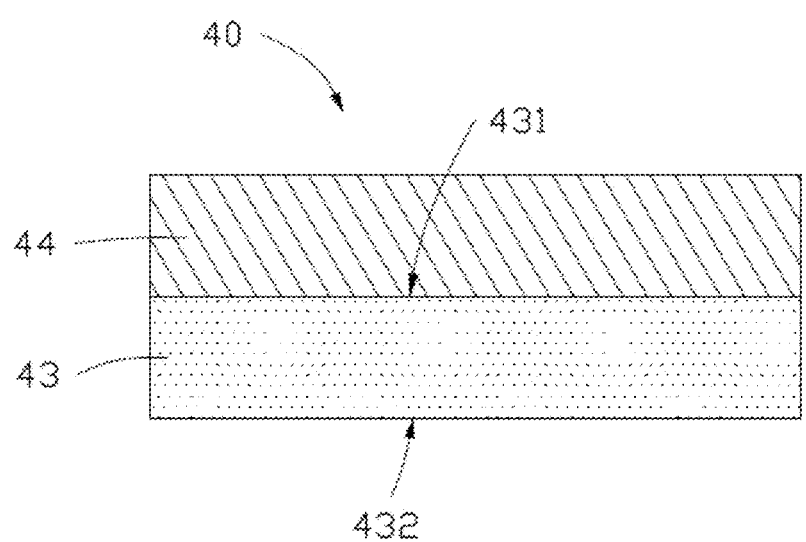
FIG. 5 is a schematic structural diagram of a first bonding member in an example.

Referring to FIG. 5, the first bonding member 40 includes a substrate layer 43 and a first bonding layer 44, where the substrate layer 43 includes a first surface 431 and a second surface 432 opposite to the first surface 431, the first bonding layer 44 is disposed on the first surface 431; and the first bonding layer 44 bonds the first starting section 11 and the separator 30. In this way, a bonding layer is provided on a single side of the substrate layer 43 of the first bonding member 40, so that the first bonding member 40 forms a single-sided adhesive structure, reducing thickness of the bonding member and reducing energy density space occupied by the first bonding member 40.

In this example of this application, the first bonding layer 44 is configured to bond the positive electrode plate 10 to the separator 30 during use, an edge of the first bonding member 40 is neat, and the first bonding member 40 cannot be melted and extended at high temperature, so that the first bonding member 40 may be configured to bond the positive electrode plate 10 to the separator 30 at room temperature instead of bonding through melting at high temperature. In addition, a coverage range of the first bonding member 40 is not increased at high temperature to avoid impact on capacity of the electrochemical apparatus 100. It should be understood that being neat herein may be understood as absence of obvious uneven curves at the edge of the first bonding member 40 when viewed in a thickness direction of the first bonding member 40.

In this example of this application, a thickness of the first bonding member 40 is 3 µm-100 µm; a material of the substrate layer 43 includes one or more of polyolefin, polyacrylonitrile, polyol ester, polyamide, polyurethane, or a compound thereof and a material of the first bonding layer 44 includes one or more of polyolefin, polyurethane, polyacrylate, organosilicone, rubber, or a compound thereof.

Figure 6:
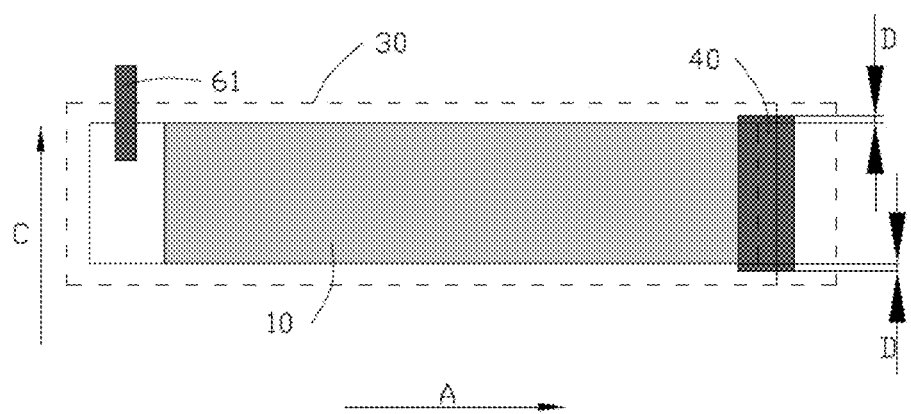
FIG. 6 is a schematic structural diagram of a positive electrode plate, a first bonding member, and a separator in the electrode assembly shown in FIG. 1 after being unfolded.

Referring to FIG. 6, in a third direction C, a side edge of the first bonding member 40 exceeds a side edge of the positive electrode plate 10. On a same side edge, a distance D between the side edge of the first bonding member 40 and the side edge of the positive electrode plate 10 is 0 mm-10 mm, so that the first bonding member 40 can fasten the positive electrode plate 10 and the separator 30 in the third direction C, reducing offset of the positive electrode plate 10 in the third direction C, thereby reducing short circuit or lithium precipitation inside the electrode assembly 100a.

Still referring to FIG. 1, the electrochemical apparatus 100 further includes a tab 60, where the tab 60 is connected to the electrode assembly 100a. Specifically, the tab 60 includes a positive electrode tab 61 and a negative electrode tab 62, where the positive electrode tab 61 is connected to the positive electrode plate 10, and the negative electrode tab 62 is connected to the negative electrode plate 20. In the second direction B, a projection of the positive electrode tab 61 and a projection of the negative electrode tab 62 on the surface of the electrode assembly 100a do not overlap, and the projection of the first bonding member 40 and the projection of the tab 60 on the surface of the electrode assembly 100a do not overlap, so that the first bonding member 40 is not included in total thickness of the electrode assembly 100a, to ensure balance of thickness of the electrode assembly 100a and ensure that energy density of the electrode assembly 100a is not affected.

Further, the electrochemical apparatus 100 further includes a second bonding member 50, the separator 30 is on an outermost ring of the electrode assembly 100a, and the second bonding member 50 is disposed at a terminating end of the separator 30 to further fasten the electrode plate in the electrode assembly 100a at a position. In the second direction B, a projection of the second bonding member 50 and the projection of the tab 60 on the surface of the electrode assembly 100a do not overlap, further maintaining balance of thickness of the electrode assembly 100a.

In the electrochemical apparatus 100, winding starting and terminating positions of the electrode plate have important impact on energy density, balance of overall thickness, and cyclic swelling of the electrochemical apparatus. During hot pressing of the electrochemical apparatus, a portion with greater thickness has better interface performance after hot pressing, and a portion with smaller thickness has relatively poorer interface performance, so that swelling stress in a later stage of cycling differs greatly, thereby causing deformation of the electrode assembly and influencing overall thickness after swelling. Therefore, positions of the first bonding member 40 and the second bonding member 50 need to be prevented from overlapping that of the tab 60 in a thickness direction to the greatest extent. Because a position of the tab is originally the thickest position of the electrode assembly, the bonding member and the tab are staggered to avoid an increase in thickness of the electrode assembly at the position of the tab, which otherwise causes more unbalanced thickness.

Figure 7:
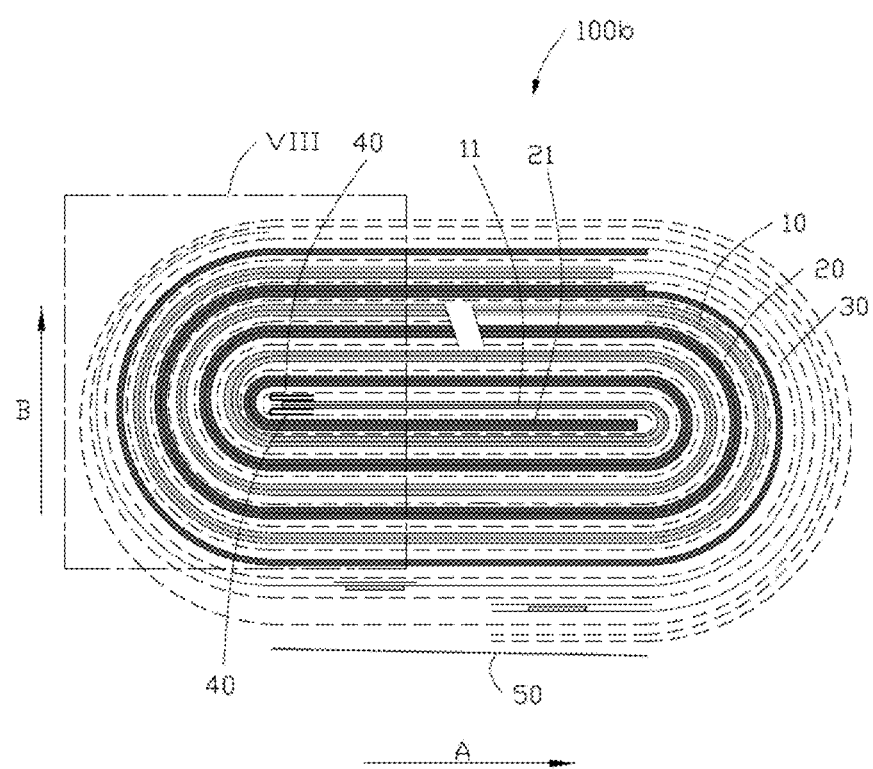
FIG. 7 is a schematic structural diagram of an electrode assembly in an example.
Figure 8:
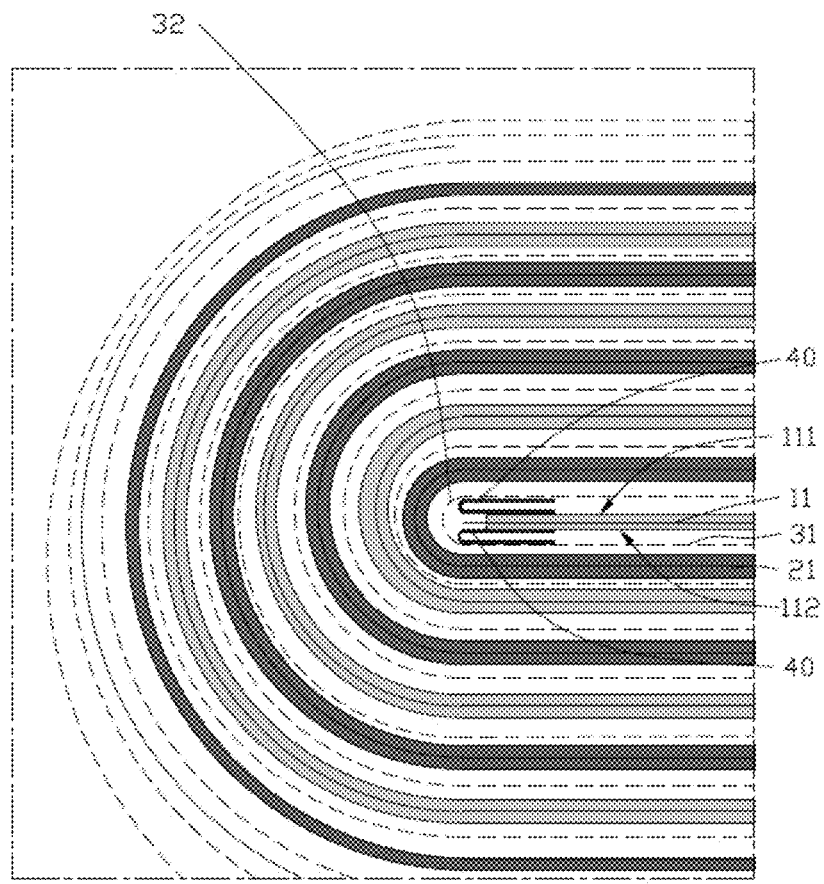
FIG. 8 is an enlarged view of a partial structure of the electrode assembly shown in FIG. 7.
Figure 9:
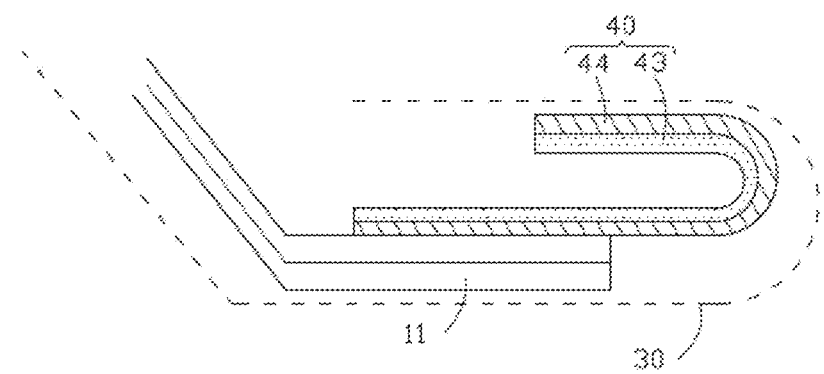
FIG. 9 is a schematic structural diagram of a connection between a positive electrode plate, a first bonding member with a single-sided adhesive structure, and a separator.

Referring to FIG. 7, FIG. 8, and FIG. 9, a structure of an electrode assembly 100b of Example 2 is substantially the same as a structure of the electrode assembly 100a of Example 1, except that in the electrode assembly 100b, two first bonding members 40 are respectively disposed on two opposite side surfaces of a first starting section 11 of a positive electrode plate 10 to bond the first starting section 11 to a separator 30. Specifically, the first bonding member 40 of Example 2 is also a single-sided adhesive structure. The first starting section 11 includes a third surface 111 and a fourth surface 112 opposite to the third surface 111. The two first bonding members 40 are respectively bent, where a first bonding layer 44 of one first bonding member 40 is bonded to the third surface 111 and the separator 30 on a side of the first starting section 11, and a first bonding layer 44 of the other first bonding member 40 is bonded to the fourth surface 112 and the separator 30 on another side of the first starting section 11. In this way, the two first bonding members 40 are configured to respectively bond two opposite sides of the first starting section 11 to the separator 30, thereby further fastening a wound electrode plate and reducing dislocation of the electrode plate during winding of the electrode assembly. In FIG. 8 and FIG. 9, a bending form of the first bonding member 40 is merely an example. The first bonding member 40 may have a folded structure shown in FIG. 8, where the first bonding layer 44 faces outward to bond the first starting section 11 to the separator 30. In addition, the first bonding member 40 may alternatively have a structure shown in FIG. 9, where after being bent, two ends of the first bonding member 40 are not flush, and the first bonding layer 44 is always disposed toward an outer side, to bond the first starting section 11 to the separator 30.

Further, in Example 2, the first starting section 11 of the positive electrode plate 10 and a second starting section 21 of a negative electrode plate 20 form an interconnection structure, where in a first direction A, an end of the first starting section 11 and an end of the second starting section 21 are respectively on two opposite sides of the electrode assembly 100b. Winding starting sections of the positive and negative electrode plates are interconnected, thereby helping maintain balance of thickness of the electrode assembly, saving internal space of the electrode assembly, and increasing capacity density.

Figure 10:
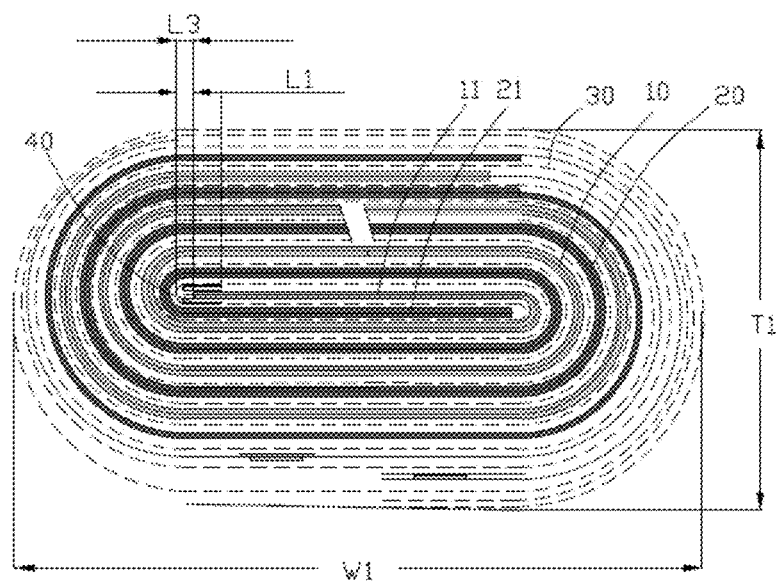
FIG. 10 is a schematic structural diagram of the electrode assembly shown in FIG. 7.

Referring to FIG. 10 and FIG. 3, in the first direction A, width of the electrode assembly 100b is $W_1$, a length of a portion of the first starting section 11 covered by the first bonding member 40 is $L_1$, a length of a portion of the first starting section 11 not covered by the first bonding member 40 is $L_2$, and a distance between the end of the first starting section 11 and a farthermost end (an arc-surfaced top position) of a first bent portion 32 is $L_3$. In a second direction B, a thickness of the electrode assembly 100b is $T_1$, where $(W_1-T_1)/10<(L_1+L_2)/2<(W_1-T_1)/2$, and $0 \text{ mm}<L_3\leq 10 \text{ mm}$. Other structures of the electrode assembly 100b are similar to the structure of the electrode assembly 100a of Example 1. Details are not described herein. In Example 2 of this application, the first bonding member 40 is also configured as the single-sided adhesive structure. A length $L_1$ of a portion of an active substance layer of the first starting section 11 covered by the first bonding member 40 is 10 mm, and a length $L_2$ of a portion of the active substance layer of the first starting section 11 not covered by the first bonding member 40 is 25 mm. The electrode assembly formed through winding has a width $W_1$ of 37 mm and a maximum thickness $T_1$ of 5.6 mm.

Figure 11:
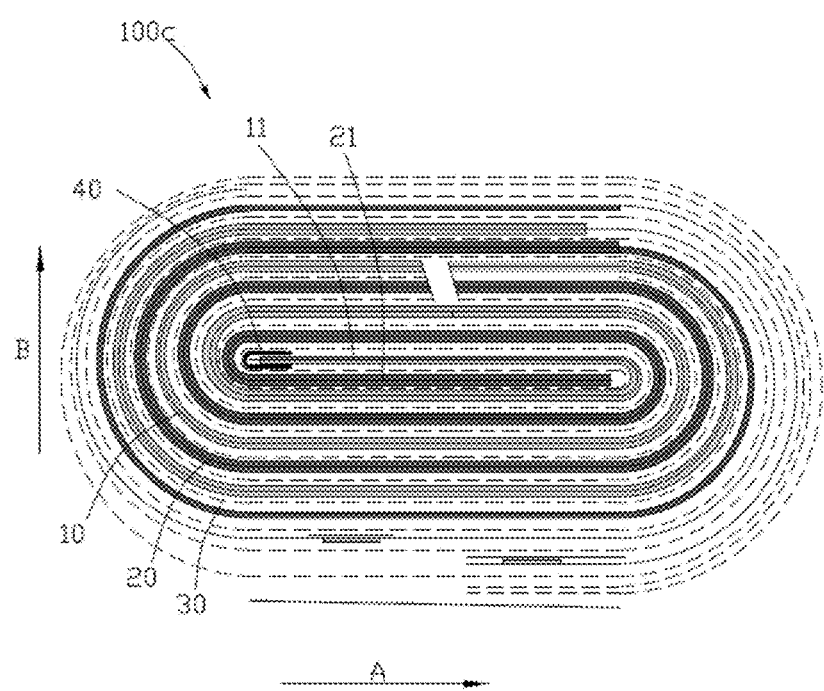
FIG. 11 is a schematic structural diagram of an electrode assembly in an example.
Figure 12:
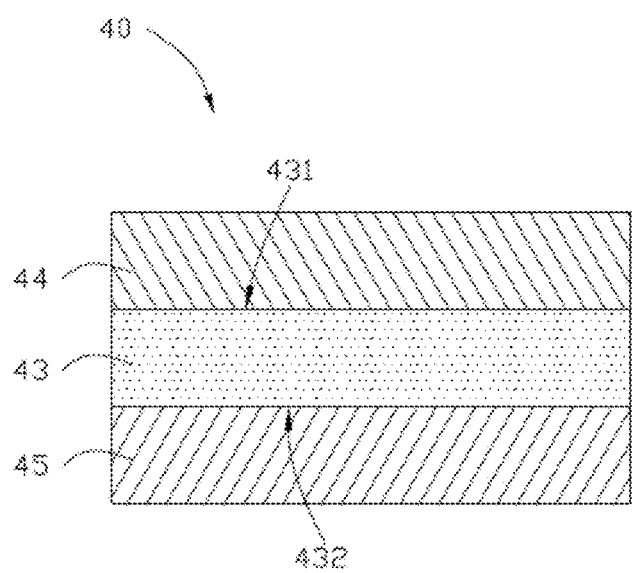
FIG. 12 is a schematic structural diagram of a first bonding member in an example.
Figure 13:
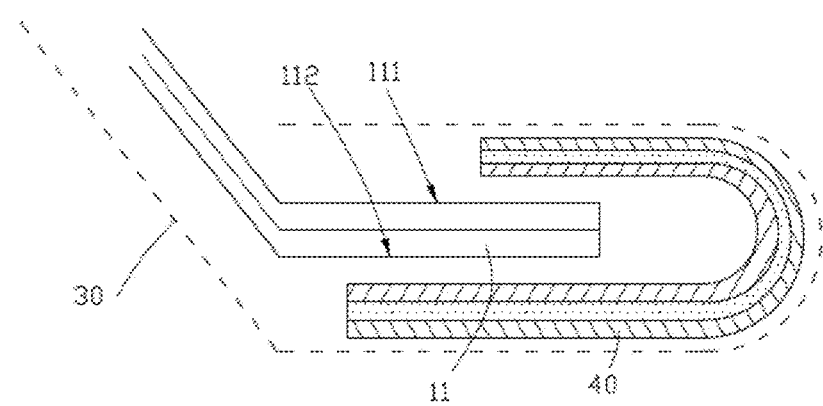
FIG. 13 is a schematic structural diagram of a joint between a positive electrode plate, a first bonding member with a single-sided adhesive structure, and a separator.

Referring to FIG. 11 and FIG. 12, in Example 3, an electrode assembly 100c is substantially the same as Example 2, except that in the electrode assembly 100c, a first bonding layer 40 further includes a second bonding layer 45, where the second bonding layer 45 is disposed on a second surface 432 of a substrate layer 43. The first bonding layer 40 covers an end of a first starting section 11, a first bonding layer 44 is bonded to a separator 30, and a second bonding layer 45 is bonded to two opposite side surfaces of the first starting section 11. As shown in FIG. 13, a structure with the first bonding member 40 covering the end of the first starting section 11 is as follows: The first bonding member 40 is bent in an electrode plate winding direction, the end of the first starting section 11 is located in a region formed by bending the first bonding member 40, the first bonding layer 44 of the first bonding member 40 is disposed toward the first starting section 11 and is bonded to a third surface 111 and a fourth surface 112 of the first starting section 11, and the second bonding layer 45 of the first bonding member 40 is disposed toward the separator 30 and is bonded to the separator 30.

In this way, the first bonding member 40 of a double-sided adhesive structure covers the end of the first starting section 11 and bonds the end of the first starting section 11 to the separator 30 to fasten a wound electrode plate, thereby reducing dislocation of the electrode plate.

In Example 3 of this application, the first bonding member 40 is configured as the double-sided adhesive structure. A length $L_1$ of a portion of an active substance layer of the first starting section 11 covered by the first bonding member 40 is 5 mm, and a length $L_2$ of a portion of the active substance layer of the first starting section 11 not covered by the first bonding member 40 is 10 mm. The electrode assembly formed through winding has a width $W_1$ of 37 mm and a maximum thickness $T_1$ of 5.6 mm.

Figure 14:
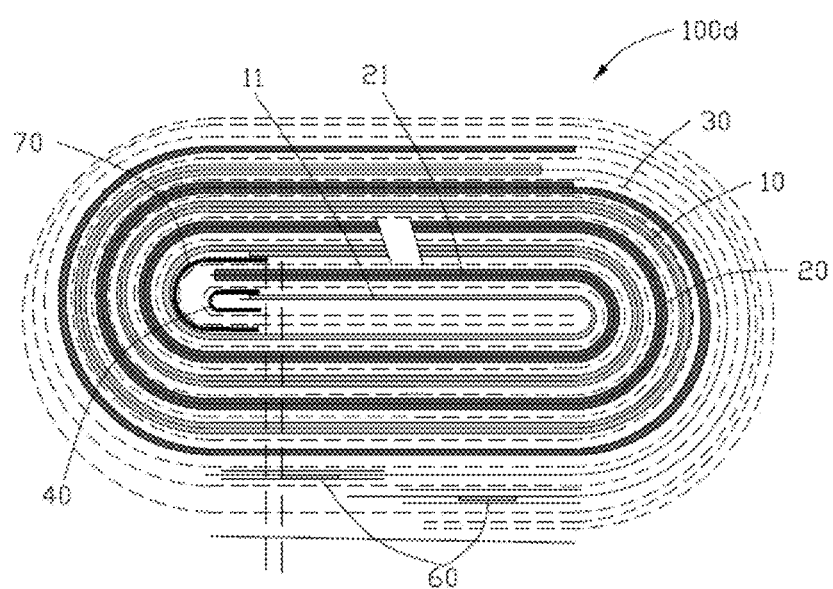
FIG. 14 is a schematic structural diagram of an electrode assembly in an example.

Referring to FIG. 14, in Example 4, an electrode assembly 100d is substantially the same as Example 3, except that the electrode assembly 100d further includes a third bonding member 70, where a structure of the third bonding member 70 is the same as the structure of the first bonding member 40 of Example 3 and is a structure with bonding layers provided on double sides. The third bonding member 70 is disposed on a side of a separator 30 facing away from an end of a first starting section 11 and an end of a second starting section 21; and the third bonding member 70 bonds a positive electrode plate 10 and the separator 30.

Specifically, the first starting section 11 of the positive electrode plate 10 is a single-sided coating structure, that is, a surface of a side of a current collector of the first starting section 11 facing a negative electrode plate 20 is coated with an active substance layer, and a surface of another side of the current collector is uncoated with the active substance layer and is a foil-free region. An end of the third bonding member 70 is partially bonded to a starting end of a double-sided coating structure of the positive electrode plate 10, and another part of the third bonding member 70 is bonded to the foil-free region of the positive electrode plate 10 and the separator 30.

The third bonding member 70 is bent in a winding direction of the positive electrode plate 10. The first bonding member 40, the end of the first starting section 11, and the end of the second starting section 21 are located inside a space formed by bending the third bonding member 70. In a second direction B, a projection of the third bonding member 70 and a projection of a tab 60 on a surface of the electrode assembly 100d do not overlap, and the projection of the third bonding member 70 and a projection of the first bonding member 40 on the surface of the electrode assembly 100d partially overlap. The third bonding member 70 can not only further fasten a wound electrode plate and reduce dislocation of the electrode plate, but also compensate for thickness difference of the electrode assembly at a winding starting end, to further balance overall thickness of the electrode assembly and enhance interface consistency of the electrode assembly.

In Example 4 of this application, the first bonding member 40 is configured as a double-sided adhesive structure. A length $L_1$ of a portion of an active substance layer of the first starting section 11 covered by the first bonding member 40 is 10 mm, and a length $L_2$ of a portion of the active substance layer of the first starting section 11 not covered by the first bonding member 40 is 25 mm. The electrode assembly formed through winding has a width $W_1$ of 37 mm and a maximum thickness $T_1$ of 5.6 mm.

Figure 15:
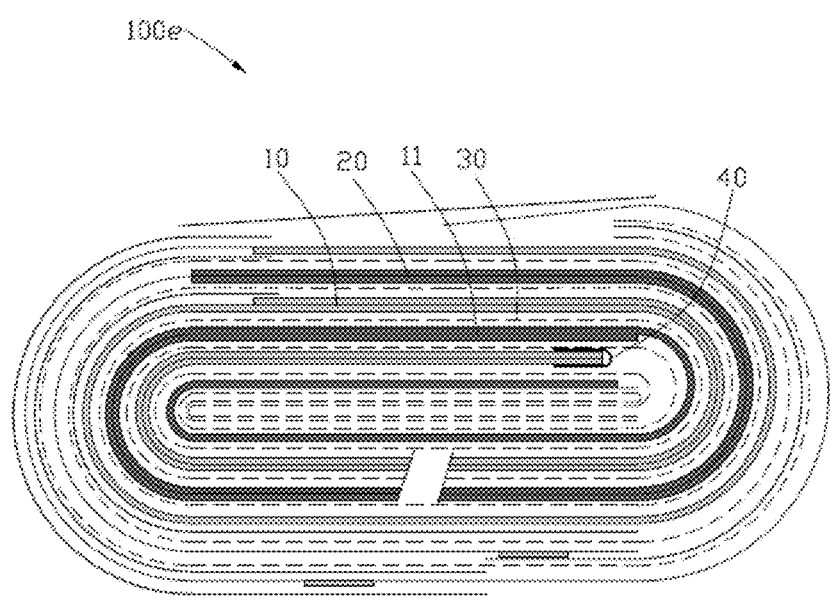
FIG. 15 is a schematic structural diagram of an electrode assembly in a comparative example.

Referring to FIG. 15, in Comparative Example 1, an electrode assembly 100e is substantially the same as Example 1, except that in the electrode assembly 100e, a first bonding member 40 with a single-sided adhesive structure coats an end of a first starting section 11, a bonding layer of the first bonding member 40 is bonded to two opposite side surfaces of the first starting section 11, and a substrate layer of the first bonding member 40 is in contact with a separator 30. In Comparative Example 1 of this application, the first bonding member 40 is configured as the single-sided adhesive structure. A length $L_1$ of a portion of an active substance layer of the first starting section 11 covered by the first bonding member 40 is 2 mm, and a length $L_2$ of a portion of the active substance layer of the first starting section 11 not covered by the first bonding member 40 is 3 mm. The electrode assembly formed through winding has a width $W_1$ of 37 mm and a maximum thickness $T_1$ of 5.6 mm.

Figure 16:
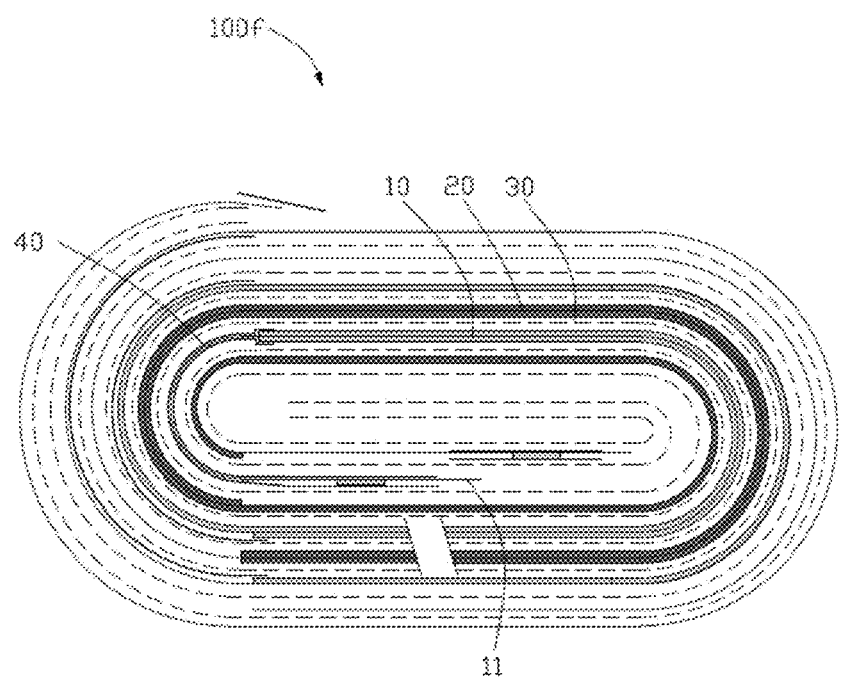
FIG. 16 is a schematic structural diagram of an electrode assembly in another comparative example.

Referring to FIG. 16, in Comparative Example 2, an electrode assembly 100f is substantially the same as Comparative Example 1, except that in the electrode assembly 100f, a first starting section 11 of a positive electrode plate 10 is a double-sided foil-free region structure, that is, neither of two opposite side surfaces of a current collector of the first starting section 11 is coated with an active substance layer, a first bonding member 40 of a double-sided adhesive structure is disposed on a surface of a foil-free region of the first starting section 11 and is bonded to a starting end of a double-sided coating structure of the positive electrode plate 10.

In Comparative Example 2 of this application, the first bonding member 40 is configured as a double-sided adhesive structure. A length $L_1$ of a portion of an active substance layer of the first starting section 11 covered by the first bonding member 40 is 25 mm, and a length $L_2$ of a portion of the active substance layer of the first starting section 11 not covered by the first bonding member 40 is 35 mm. The electrode assembly formed through winding has a width $W_1$ of 37 mm and a maximum thickness $T_1$ of 5.6 mm.

A process for preparing the electrode assembly of the foregoing examples and comparative examples was as follows: Slurries made of positive and negative electrode active materials were respectively applied on surfaces of metal substrates of the positive and negative electrodes, and then subjected to drying and cold pressing to prepare electrode plates. The electrode plate was cut into shapes, then was welded with a tab and placed on a winding device (or manually wound). The first bonding member 40 of this technical solution was bonded to a front portion of the electrode plate. Width of a bonded portion for covering the electrode plate was controlled. The electrode plate and a starting front portion of a separator were stacked on a winding device. In this case, the separator and the electrode plate were fastened together by the bonding layer. The electrode plates and the separator were jointly wound in a same direction through close fit to a winding clamp to finally form the electrode assembly. The electrode assembly was subjected to a series of processes such as heating for water content removal, electrolyte injection, high-temperature heating for infiltration, formation for charging activation, and edge folding, so that a finished electrochemical apparatus was finally prepared.

Table 1 shows data comparison of parameters such as defective rate, thickness, and capacity of the electrochemical apparatus prepared in the examples and comparative examples.

To prevent lithium precipitation, a periphery of the negative electrode plate in length and width directions exceeds the positive electrode plate; and an overhang is a part of the negative electrode plate exceeding the positive electrode plate in the length and width directions. In view of displacement and tolerance misalignment and fluctuation in a manufacturing process, generally, overhangs at four corners are detected through x-ray in the width direction after a finished product is obtained through winding; and the electrochemical apparatus is disassembled in the length direction to spread an electrode plate at an original position to determine and measure overhangs of a front portion and a rear portion, and if the overhang≤0, not good NG is recorded.

A method for measuring thickness of the electrochemical apparatus was as follows: A fixed pressure contact type PPG thickness tester was used for measurement. A standard block was used for calibration before the test.

A method for measuring capacity of the electrochemical apparatus was as follows: In an environment at 25° C., a capacity test device was configured to conduct a charge and discharge capacity test of the finished electrochemical apparatus. A test procedure was as follows: The electrochemical apparatus was charged to 4.2 V at a constant current of 0.5 C, then charged to 0.05 C at a constant voltage, left for standing for 10 min, and then discharged to 2.8 V at a direct current of 0.2 C. Charging and discharging were repeatedly performed for three times under a same charging condition, and discharge capacities were determined; and an average of the three discharge capacities was taken as an initial capacity of the electrochemical apparatus.

TABLE 1

| Item | A/C overhang defective rate | S/A overhang defective rate | Thickness (mm) | Capacity (Ah) |
| --- | --- | --- | --- | --- |
| Example 1 | 1.5% | 1.2% | 5.20 | 2.45 |
| Example 2 | 1% | 0.5% | 5.22 | 2.44 |
| Example 3 | 1.4% | 0.8% | 5.26 | 2.45 |
| Example 4 | 0.8% | 1.5% | 5.31 | 2.43 |
| Comparative Example 1 | 10% | 3.3% | 5.25 | 2.45 |
| Comparative Example 2 | 0.8% | 0.3% | 5.47 | 2.39 |

It can be seen from comparison of data in Table 1 that, in the electrochemical apparatus 100 in the examples of this application, the first bonding member 40 being provided between the first starting section 11 of the positive electrode plate 10 and the separator 30 can effectively reduce dislocation of the electrode plate during winding, reduce lithium precipitation in the electrochemical apparatus, and maintain high volumetric energy density. In addition, when the first bonding member 40 is provided at an end region of the first starting section 11 in a small range, an edge of the negative electrode plate can be kept larger than that of the positive electrode plate while minimizing the size difference between the edge of the negative electrode plate and the edge of the positive electrode plate to the greatest extent, thereby effectively increasing energy density and inhibiting formation of lithium dendrites.

An embodiment of this application further provides a preparation method of electrochemical apparatus, where the preparation method is used for preparing the electrochemical apparatus 100 described in the foregoing embodiments, and the preparation method includes:

Step 1: Coat a surface of a substrate layer with a first bonding layer, where the first bonding layer is configured for bonding during use; and prepare a first bonding member, where an edge of the first bonding member is neat. Further, two opposite side surfaces of the substrate layer may alternatively be coated with a first bonding layer and a second bonding layer separately to form a first bonding member with a double-sided adhesive structure.

Step 2: Bond the first bonding member to a winding starting end of a positive electrode plate.

Positive and negative electrode plates may be formed through coating of the surface of the metal substrate with slurries made of negative and positive electrode active materials, drying and cold pressing, and then the positive and negative electrode plates are cut into shapes, welded with tabs and then stored for later use. The first bonding member in this application is bonded to the winding starting end of the positive electrode plate, that is, the first bonding member is bonded to a front portion of the positive electrode plate, and width of a bonded portion for covering the electrode plate during bonding is controlled, thereby satisfying a requirement for fastening the electrode plate and reducing a bonding area.

Step 3: Stack the positive electrode plate, a negative electrode plate, and a separator, where a first end of the first bonding member is bonded to the winding starting section of the positive electrode plate, and a second end of the first bonding member is bonded to the separator, to fasten the electrode plate and the separator at relative positions.

Specifically, the positive electrode plate and a starting front portion of the separator are stacked on a winding machine. In this case, the separator and the positive electrode plate are fastened together by a bonding layer. The negative electrode plate is stacked on a side of the separator facing away from the positive electrode plate.

Step 4: Wind the positive electrode plate, the negative electrode plate, and the separator that are stacked, where the separator is disposed between the positive electrode plate and the negative electrode plate to form an electrode assembly with a wound structure.

Specifically, the positive and negative electrode plates and the separator are jointly wound in a same direction through close fit to a winding clamp to finally form the electrode assembly.

Step 5: Package the electrode assembly and subject the electrode assembly to formation, to form an electrochemical apparatus.

Specifically, the wound electrode assembly is subjected to a series of processes such as heating for water content removal, electrolyte injection, high-temperature heating for infiltration, formation for charging activation, and edge folding, so that a finished electrochemical apparatus is finally prepared.

The foregoing embodiments are merely intended to describe the technical solutions of this application, but not intended to constitute any limitation. Although this application is described in detail with reference to the foregoing preferred embodiments, persons of ordinary skill in the art should understand that modifications or equivalent replacements can be made to the technical solutions of this application, without departing from the spirit and scope of the technical solutions of this application.

What is claimed is:

1. An electrochemical apparatus, comprising an electrode assembly, wherein the electrode assembly comprises a positive electrode plate, a negative electrode plate and a separator; the separator is disposed between the positive electrode plate and the negative electrode plate; and the positive electrode plate, the negative electrode plate, and the separator are wound to form the electrode assembly;

the electrochemical apparatus further comprises a first bonding member, a winding starting layer of the positive electrode plate comprises a first starting section, a first end of the first bonding member is bonded to the first starting section; and a winding starting layer of the separator comprises a first straight portion and a first bent portion, wherein the first straight portion and the first bent portion are connected to each other, a winding starting layer of the negative electrode plate comprises a second starting section, an end of the second starting section is located at a side of the first bent portion, and a second end of the first bonding member is bonded to a side of the first bent portion facing away from the second starting section.

2. The electrochemical apparatus according to claim 1, wherein in a first direction, the first bent portion exceeds an end of the first starting section; in the first direction, a width of the electrode assembly is $W_1$, a length of a portion of the first bonding member that covers the first starting section is $L_1$, and a length of a portion of the first bonding member that does not cover the first starting section is $L_2$; in a second direction, a thickness of the electrode assembly is $T_1$; and the second direction is perpendicular to the first direction; wherein $(W_1-T_1)/10<(L_1+L_2)/2<(W_1-T_1)/2$.

3. The electrochemical apparatus according to claim 2, wherein in the first direction, a distance between the end of the first starting section and an end of the first bent portion is $L_3$, wherein $0$ mm$<L_3\leq 10$ mm.

4. The electrochemical apparatus according to claim 2, wherein in the first direction, a length of the first starting section is $L_4$, and a length of the second starting section is $L_5$, wherein $L_4-L_1\leq L_5$.

5. The electrochemical apparatus according to claim 1, wherein the first bonding member comprises a substrate layer and a first bonding layer, the substrate layer comprises a first surface and a second surface opposite to the first surface, the first bonding layer is disposed on the first surface, and the first bonding layer is bonded to the first starting section and the separator.

6. The electrochemical apparatus according to claim 5, wherein the first bonding member is bent, and the first bonding layer of the first end and the first bonding layer of the second end are disposed toward a same side of the substrate layer.

7. The electrochemical apparatus according to claim 5, wherein the first bonding member is bent, and the first bonding layer of the first end and the first bonding layer of the second end are disposed facing opposite directions separately.

8. The electrochemical apparatus according to claim 5, wherein the first bonding member further comprises a second bonding layer, the second bonding layer is disposed on the second surface of the substrate layer, the first bonding member covers the end of the first starting section, the first bonding layer is bonded to the separator, and the second bonding layer is bonded to two opposite side surfaces of the first starting section.

9. The electrochemical apparatus according to claim 1, wherein the electrochemical apparatus further comprises a tab, the tab is connected to the electrode assembly; and in a second direction, a projection of the first bonding member and a projection of the tab on a surface of the electrode assembly do not overlap.

10. The electrochemical apparatus according to claim 1, wherein in a third direction, a side edge of the first bonding member exceeds a side edge of the positive electrode plate; and on a same side edge, a distance between the side edge of the first bonding member and the side edge of the positive electrode plate is $0$ mm-$10$ mm.

11. The electrochemical apparatus according to claim 9, wherein the electrochemical apparatus further comprises a second bonding member, the separator is on an outermost ring of the electrode assembly, and the second bonding member is disposed at a terminating end of the separator.

12. The electrochemical apparatus according to claim 11, wherein in the second direction, a projection of the second bonding member and the projection of the tab on the surface of the electrode assembly do not overlap.

13. The electrochemical apparatus according to claim 5, wherein a thickness of the first bonding member is $3$ μm-$100$ μm; a material of the substrate layer comprises one or more of polyolefin, polyacrylonitrile, polyol ester, polyamide, polyurethane, or a compound thereof; and a material of the first bonding layer comprises one or more of polyolefin, polyurethane, polyacrylate, organosilicone, rubber, or a compound thereof.

14. The electrochemical apparatus according to claim 13, wherein the first bonding layer is configured to bond the first starting section and the separator during use.

15. The electrochemical apparatus according to claim 1, wherein an edge of the first bonding member is neat.

16. A preparation method of an electrochemical apparatus, the preparation method comprises:
preparing a first bonding layer to bond a first bonding member to a winding starting end of a positive electrode plate;
stacking the positive electrode plate, a negative electrode plate, and a separator, wherein a first end of the first bonding member is bonded to the positive electrode plate, and a second end of the first bonding member is bonded to the separator; and
winding the positive electrode plate, the negative electrode plate, and the separator that are stacked, wherein the separator is disposed between the positive electrode plate and the negative electrode plate;
wherein a winding starting layer of the separator comprises a first straight portion and a first bent portion, wherein the first straight portion and the first bent portion are connected to each other, a winding starting layer of the negative electrode plate comprises a second starting section, an end of the second starting section is located at a side of the first bent portion, and a second end of the first bonding member is bonded to a side of the first bent portion facing away from the second starting section.

17. An electronic apparatus, comprising an electrochemical apparatus, the electrochemical apparatus comprising an electrode assembly, wherein the electrode assembly comprises a positive electrode plate, a negative electrode plate and a separator; the separator is disposed between the positive electrode plate and the negative electrode plate; and the positive electrode plate, the negative electrode plate and the separator are wound to form the electrode assembly;
the electrochemical apparatus further comprises a first bonding member, a winding starting layer of the positive electrode plate comprises a first starting section, a first end of the first bonding member is bonded to the first starting section; and
a winding starting layer of the separator comprises a first straight portion and a first bent portion, wherein the first straight portion and the first bent portion are connected to each other, a winding starting layer of the negative electrode plate comprises a second starting section, an end of the second starting section is located at a side of the first bent portion, and a second end of the first bonding member is bonded to a side of the first bent portion facing away from the second starting section.

18. The electronic apparatus according to claim 17, wherein a winding starting layer of the separator comprises a first straight portion and a first bent portion connected to the first straight portion, the negative electrode plate comprises a second starting section, an end of the second starting section is located at a side of the first bent portion, and the second end of the first bonding member is bonded to a side of the first bent portion facing away from the second starting section.

19. The electronic apparatus according to claim 18, wherein in a first direction, the first bent portion exceeds an end of the first starting section; in the first direction, a width of the electrode assembly is $W_1$, a length of a portion of the first bonding member that covers the first starting section is $L_1$, and a length of a portion of the first bonding member that does not cover the first starting section is $L_2$; in a second direction, a thickness of the electrode assembly is T; and the second direction is perpendicular to the first direction; wherein $(W_1-T_1)/10<(L_1+L_2)/2<(W_1-T_1)/2$.

* * * * *